(12) United States Patent
Lin

(10) Patent No.: US 6,278,501 B1
(45) Date of Patent: Aug. 21, 2001

(54) THREE DIMENSIONAL LIQUID CRYSTAL SHUTTER GLASSES

(75) Inventor: Ming-Yen Lin, Taipei (TW)

(73) Assignee: Artificial Parallax Electronics Corp., Taipei (TW)

( * ) Notice: Subject to any disclaimer, the term of this patent is extended or adjusted under 35 U.S.C. 154(b) by 0 days.

(21) Appl. No.: 09/447,344

(22) Filed: Nov. 22, 1999

(51) Int. Cl.⁷ .............................. G02C 1/13; G02B 27/22
(52) U.S. Cl. .............................. 349/13; 349/15; 351/41; 359/462
(58) Field of Search .................................. 349/13, 15, 58; 351/41, 44, 49.086, 158; 348/51–53, 57; 359/464, 465, 40, 41, 63, 83; 345/55

(56) References Cited

U.S. PATENT DOCUMENTS

| D. 431,042 | * | 9/2000 | Lin ...................................... D16/304 |
| 4,508,526 | * | 4/1985 | Dutcher ............................... 493/346 |
| 4,740,069 | * | 4/1988 | Baum .................................... 351/57 |
| 4,968,127 | * | 11/1990 | Russell et al. ...................... 351/44 |
| 5,463,428 | * | 10/1995 | Lipton et al. ........................ 351/158 |
| 5,598,231 | * | 1/1997 | Lin ........................................ 351/49 |
| 5,956,001 | * | 9/1999 | Sumida et al. ......................... 345/55 |
| 6,034,653 | * | 3/2000 | Robertson et al. ...................... 345/8 |
| 6,115,177 | * | 9/2000 | Vossler ................................ 359/465 |

* cited by examiner

Primary Examiner—William L. Sikes
Assistant Examiner—Tarifur R. Chowdhury
(74) Attorney, Agent, or Firm—Dougherty & Troxell

(57) ABSTRACT

One amendatory structure of 3D LCS glasses, it is further a pair of 3D glasses being designed based on human ergonomic that provides a more light-weighted and comfortable wearing condition, that is, the present invention allows users to enjoy many different types of 3D applications by wearing the present invention for a longer period of time. By means of three individual parts, including a frame, a shelf and an nose-rack, the present invention can be assembled by connecting each part, or disassembled into three separate parts. The frame of the present invention is designed to be rotary and can be flipped up and down, while the nose-rack is designed to be adjusted vertically. The best wearing condition can be achieved by adjusting position of the frame and the nose-rack.

10 Claims, 5 Drawing Sheets

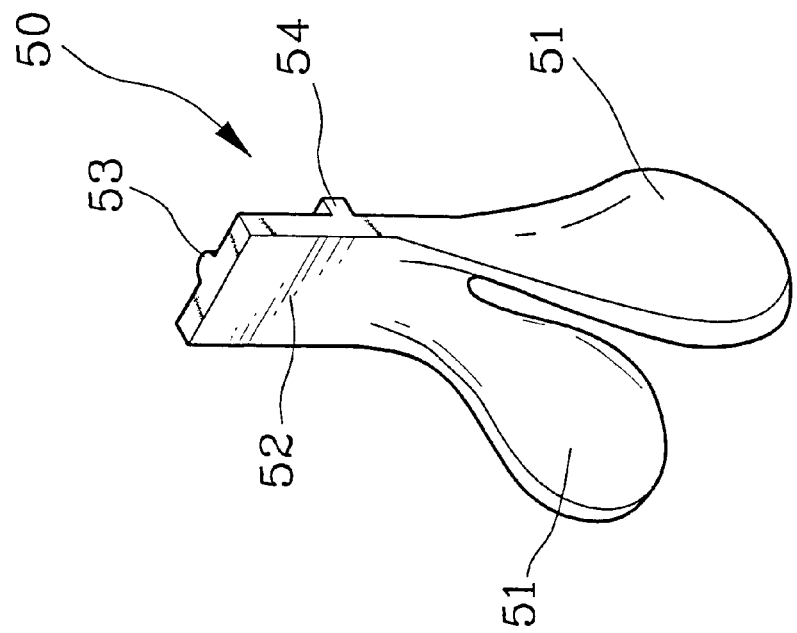
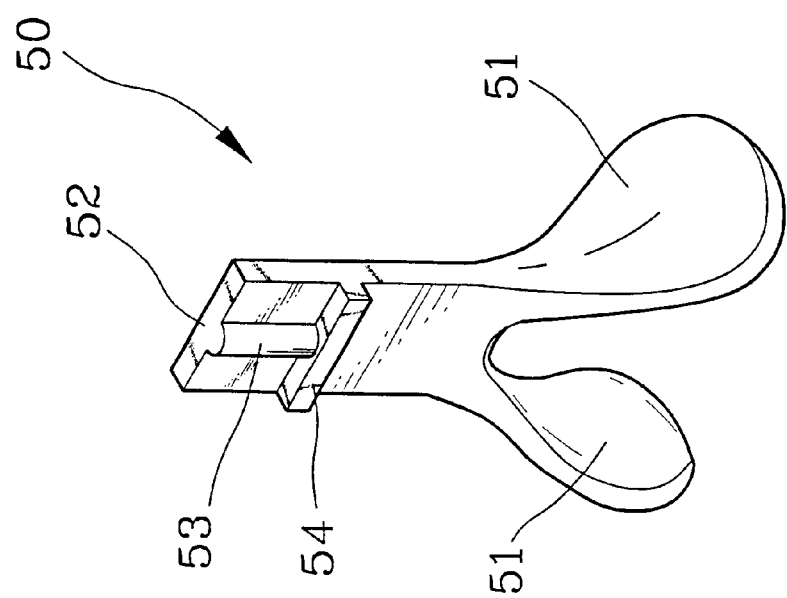

THREE DIMENSIONAL LIQUID CRYSTAL SHUTTER GLASSES

BACKGROUND OF THE INVENTION

1. Field of the Invention

This invention names one amendatory structure of 3D LCS (Liquid Crystal Shutter) glasses with improved design. The amendatory structure of 3D LCS glasses consists of several components that include specially designed links. The improved 3D LCS glasses provides the most comfortable wearing condition by allowing users to dynamically adjust the glasses using those specially designed links.

2. Background of the Invention

The drawback of the existing 3D LCS glasses is that they were not designed based on ergonomics. They were just designed as goggles to view 3D images. In consequence, those types of 3D LCS glasses do not adapt very well to different shapes of human faces, and thus cause uncomfortable wearing condition for most of the users. In addition, the bulky frame and extra weight of the existing 3D LCS glasses make marketing of such glasses more difficult.

Therefore, a need exists for a new 3D LCS glasses design that improves the wearing condition and outlook of the glasses in order to gain more public acceptance of such glasses in many different areas where stereoscopic applications are available. The present disclosure, one amendatory structure of 3D LCS glasses, provides an improved design that is more light-weighted, comfortable, adjustable and stylish to all 3D glasses users.

SUMMARY OF THE INVENTION

The present invention that is called one amendatory structure of 3D LCS glasses is designed based on human ergonomics for providing end users with comfortable wearing condition and compacted physical size. This new structure consists of three parts: a glasses frame, a shelf and a nose-rack. A 3D LCS glasses can be easily assembled by connecting those 3 parts together through the specially design links. The curved and elastic shelf can easily fit into different types of human faces. In addition, the position of the nose-rack can be easily adjusted to obtain the most comfortable wearing condition by the end users. The frame that includes the LC shutter is also designed to be rotary and can be flipped up and down according to different wearing situations. The detail of this invention will be described hereafter.

BRIEF DESCRIPTION OF THE DRAWINGS

FIG. 4 B is a lateral view showing the spatial layout of liquid crystal shutters and other components according to the present invention.

FIG. 5 A and 5 B are solid diagrams of the nose-rack according to the present invention.

DETAILED DESCRIPTION OF THE PREFERRED EMBODIMENT

The present invention that is called one amendatory structure of 3D LCS glasses has overcome the aforesaid disadvantages of the conventional 3D glasses. The improved 3D LCS glasses is designed according to human ergonomics and provides more convenient and comfortable wear conditions to end users. The present invention is a new structure of 3D LCS glasses that consists of three basic parts: a frame, a shelf and a noserack. This new structure has the following characteristics.

Easy Assembly and Disassembly

With the specially designed link for each part, the present invention allows a 3D glasses to be easily assembled by connecting each part, or disassembled into three separate parts.

Design for Comfort

The elastic arm on the shelf can be bent to fit and softly hold different shapes of human faces, and the nose-rack can be adjusted vertically when connecting to the shelf to create the most comfortable wearing condition for the end users.

Design for Convenience

The frame that contains the LC shutter is also designed to be rotary and can be flipped up and down according to the different viewing situations.

Figure 1:
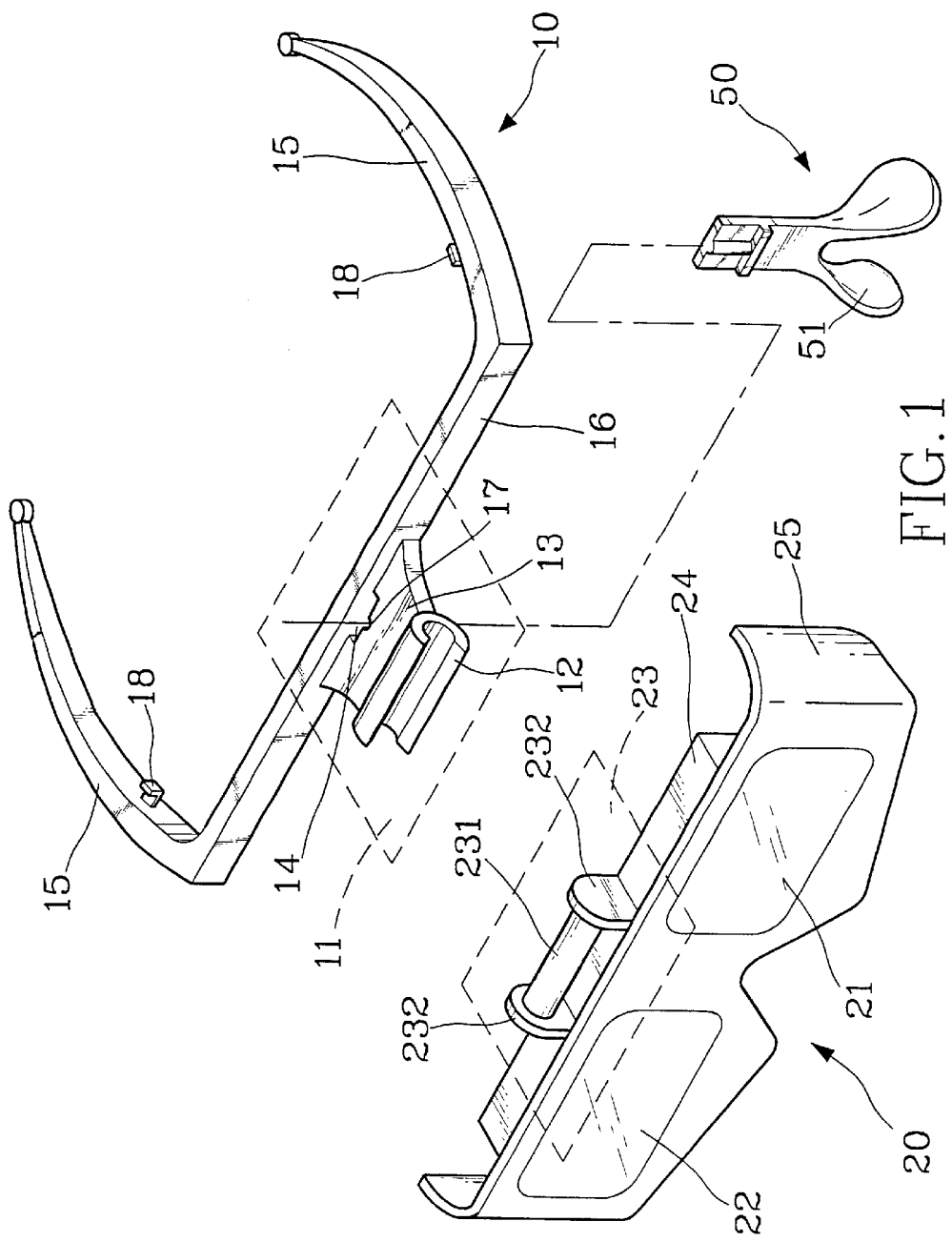
FIG. 1 is a solid diagram of the first preferred embodiment of the present invention.

More detailed illustration about the first preferred embodiment of the present invention is shown in FIG. 1. It is a solid diagram showing the structure of the first embodiment according to the present invention.

The improved 3D glasses can be separated to three demountable parts including a shelf 10, a frame 20 and a nose-rack 50. A joint 11 furnished on the shelf 20 links the frame 20 and the nose-rack 50, and allows the frame 20 to be rotary and the nose-rack 50 to be movable for different wearing conditions.

Referring to FIG. 1, the frame 20 consists of an outer frame 25 and an inner frame 24. Two LC shutters, the right LC shutter 21 and a left LC shutter 22, are embedded inside the frame 20. The mechanism to build those two LC shutters inside the frame will be described hereafter. We first describe the linkage between the shelf 10 and the frame 20.

The shelf 10 and the frame 20 are connected through a joint 11 and a connector 23, which are attached to the shelf 10 and the frame 20 respectively. The connector 23 consists of a shaft 231 and two convex plates 232 and is set on the middle of the inner frame 24. The shaft 231 is fixed and supported by the two convex plates 232. By inserting the shaft 231 into the joint 11, the frame 20 can be held by the shelf 10 and is capable of flipping up and down.

The shelf 10 consists of two ear-racks 15, a connecting rack 16 and a joint 11. The connecting rack 16 connects two ear-racks 15 and the joint 11. There is a L-shaped hook 18 furnished on the proper position of each ear-rack 15. The L-shaped hook 18 is used to affix a conductive cable 465 to the ear-rack 15. The functions of the conductive cable 465 will be described hereafter in FIG. 3.

The joint 11 is set on the middle of the connecting rack 16. The joint 11 consists of a connecting plate 13 and a hooked cylinder 12. With a proper breach opened on the rim, the hooked cylinder 12 can buckle the shaft 231 of the frame 20 tightly and allows the frame 20 to be rotary for being flipped up and down. A connecting hole 14 with a sliding ditch 17 is cut from the connecting plate 13. The connecting hole 14 is used for sliding the nose-rack 50 vertically to connect the shelf 10 and the nose-rack 50. The best adjoining condition between the nose-rack 50 and the human nose can be easily obtained by adjusting the nose-rack 50 up or down through the connecting hole 14.

Figure 2:
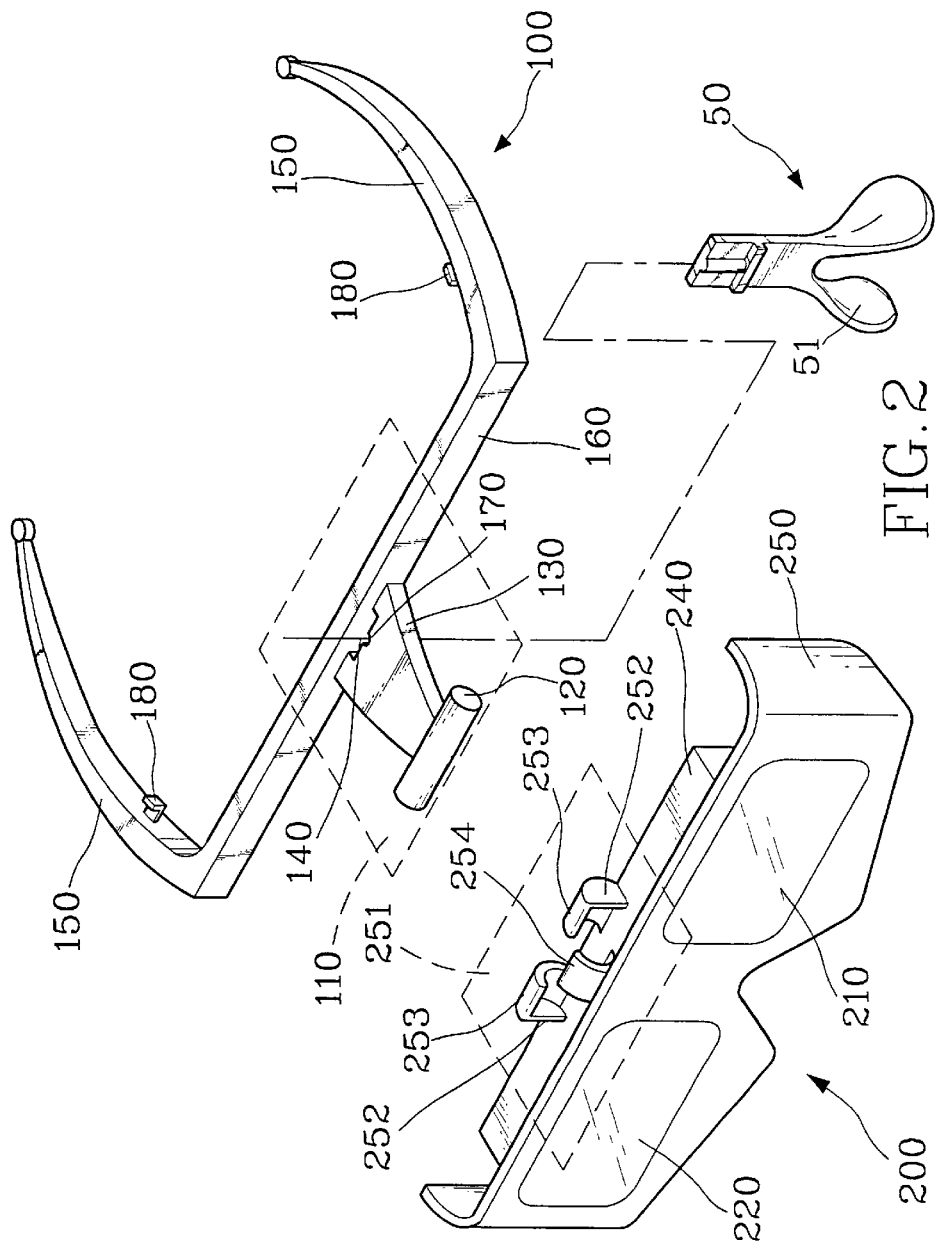
FIG. 2 is a solid diagram of the second preferred embodiment of the present invention.

Referring to FIG. 2, there is the solid diagram of the second preferred embodiment of the present invention. The frame 200 and the shelf 100 are connected through a joint housing 251 and a connector 110, which are attached to the frame 200 and the shelf 100 respectively. The connector 110 consists of a shaft 120 and a connecting plate 130 and is set on the middle of the shelf 100. By inserting the shaft 120 into the joint housing 251, the frame 200 can be held by the shelf 100 and is capable of flipping up 4and down.

The joint housing 251 is set on the middle of the inner frame 240. The joint housing 251 consists of two side plate 252, one front plate 254 and two back plate 253. With a proper and cylindrical cavity formed by the plates 252, 253 and 254, the joint housing 251 can buckle the shaft 120 of the shelf 100 tightly and allows the frame 200 to be rotary for being flipped up and down.

The shelf 100 is similar to the one of the first embodiment. The shelf 100 consists of two ear-racks 150, a connecting rack 160 and a connector 110. The connecting rack 160 connects two ear-racks 150 and the connector 110. There is a L-shaped hook 180 furnished on the proper position of each ear-rack 150. The L-shaped hook 180 is used to affix a conductive cable 465 to the ear-rack 150. Again, the functions of the conductive cable 465 will be described hereafter in FIG. 3. A connecting hole 140 with a sliding ditch 170 is cut from the connecting plate 130. The connecting hole 140 is used to connect the shelf 100 and the nose-rack 50. By sliding the nose-rack 50 along the connecting hole 140, the best adjoining condition between the nose-rack 50 and the human nose can be easily obtained.

Figure 3:
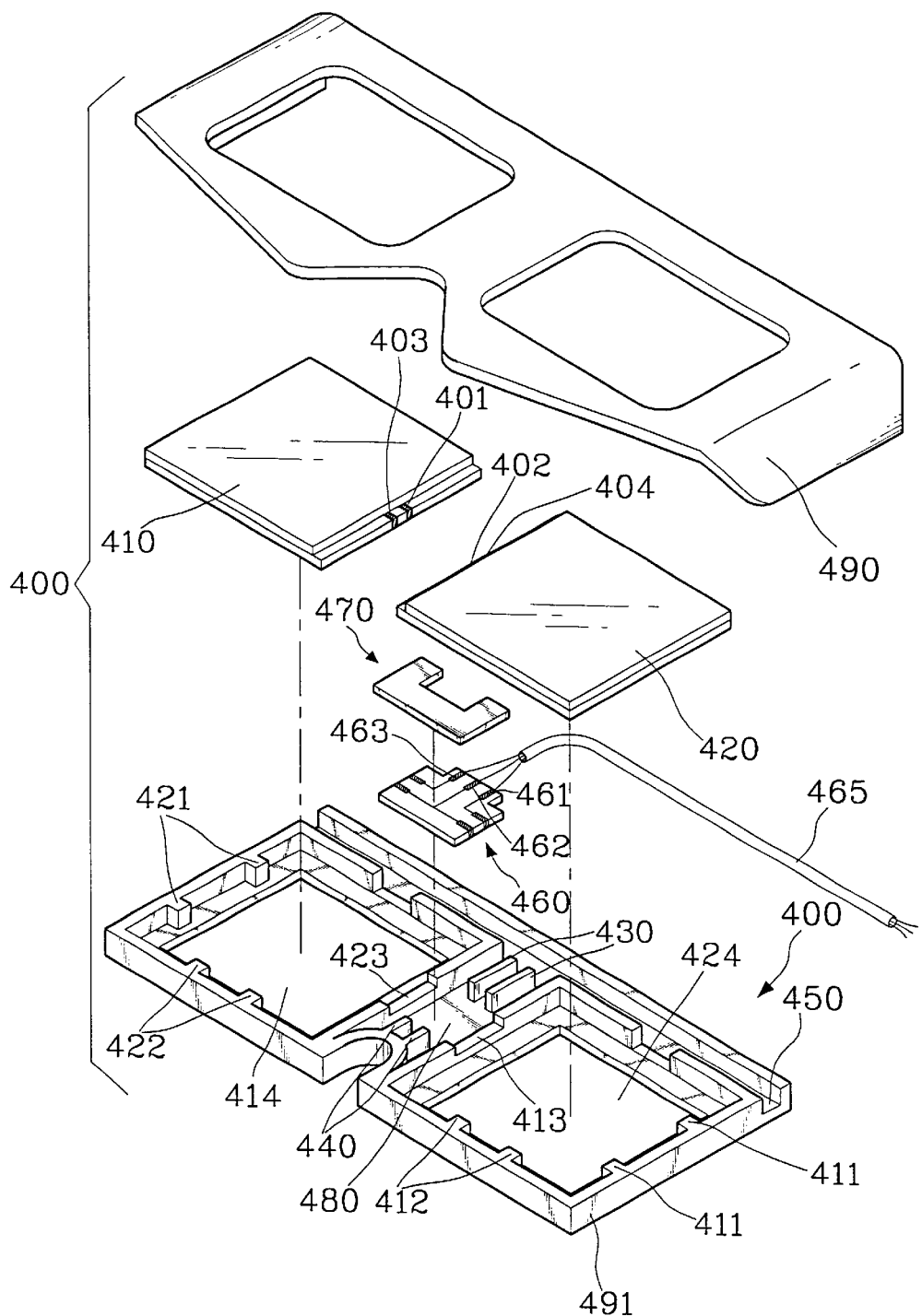
FIG. 3 is a solid diagram of a frame according to the present invention.

Referring to FIG. 3, there is a solid diagram of a frame according to the present invention. The frame 400 consists of an outer frame 490 and an inner frame 491. The inner frame 491 is used to accommodate the following components: the left LC shutter 410, the right LC shutter 420, the PCB (Printed Circuit Board) 460, conductive rubber pad 470 and conductive cable 465. The outer frame 490 is a cover that is used to pack all of the mentioned components tightly with the inner frame 491. The inner frame 491 itself includes two glass basins 414, 424, two rubber pad breaches 413, 423, one PCB basin 480 and one cable groove 450. The two glass basins 414 and 424 are used to install the left LC shutter 410 and the right LC shutter 420 respectively. Several tiny bricks 411, 412, 421, 422 furnished on the proper sides of the glasses basins 414, 424 are used to align and fix the position of both LC shutters 410, 420. The two rubber pad breaches 413 and 423 opened on the near opposite rim of the two glass basins 414 and 424 are used to locate the conductive rubber pad 470. The PCB basin 480 furnished between the two glass basins 414, 424 is used to install the PCB 460. The upper positioning plank 430 and the lower positioning plank 440 furnished on the proper positions of the PCB basin 480 is used to fix the position of the PCB 460. The cable groove 450 set at the top position of the inner frame 491 is used to locate the conductive cable 465.

The PCB 460 includes one right control line 461, one ground line 462 and one left control line 463. The conductive cable 465 connects all three lines 461, 462, 463 to the outside of the frame 400. The electric conductivity between the LC shutter 410, 420 and PCB 460 can be conducted through the conductive rubber pad 470. The conductive rubber pad 470 is set on top of the PCB 460, the electrodes 401, 403 of the left LC shutter 410 and the electrodes 402, 404 of the right LC shutter 420.

Figure 4A:
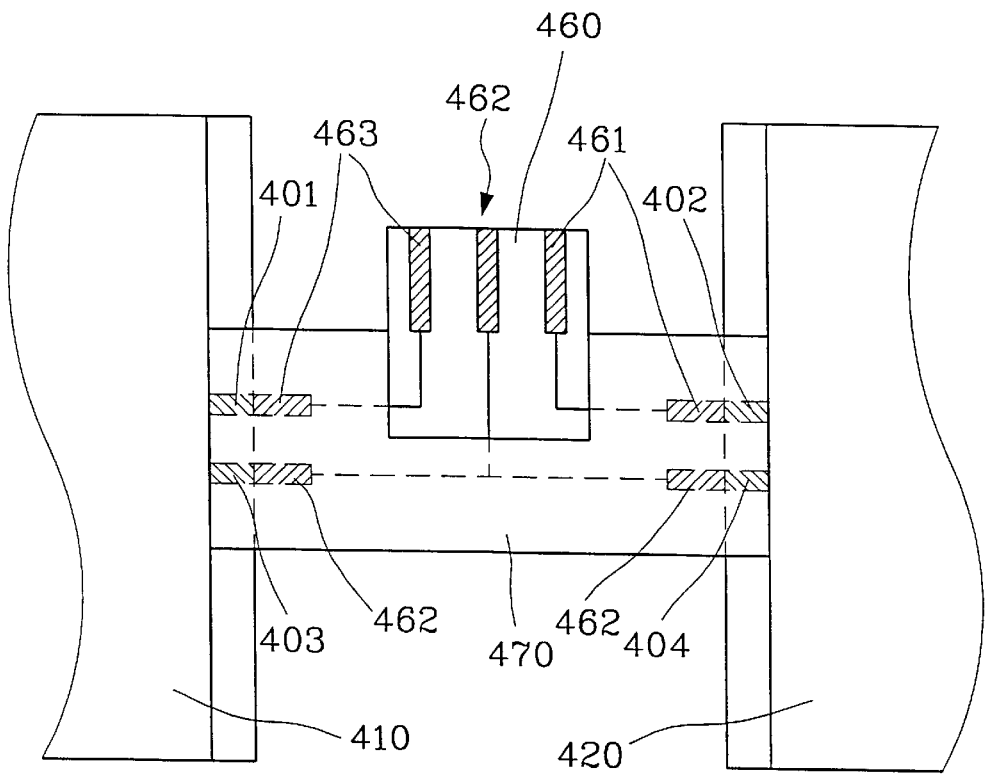
FIG. 4 A is a top view showing the spatial layout of liquid crystal shutters and other components according to the present invention.
Figure 4B:
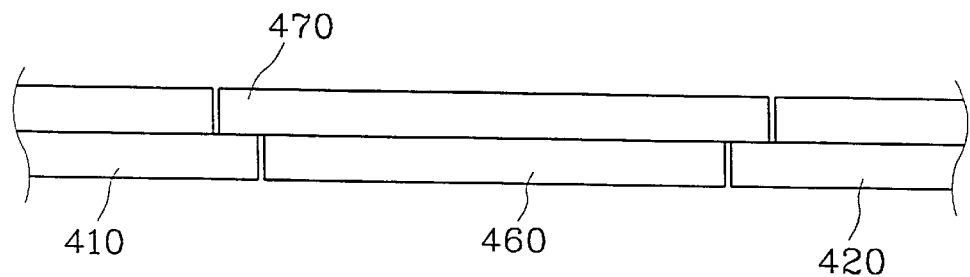

Referring to FIG. 4, FIG. 4A is the top view showing the spatial layout of LC shutters and other components according to the present invention, and FIG. 4B is the lateral view of the spatial layout of the LC shutters. The components illustrated in FIG. 4 are the left LC 410, the right LC shutter 420, the PCB 460 and the conductive rubber pad 470. There are one left signal electrode 401 and the first ground electrode 403 set on the glass of the left crystal shutter 410, and there are one right signal electrode 402 and the second ground electrode 404 set on the glass of the right crystal shutter 420. The PCB 460 includes the right control line 461, the ground line 462 and the left control line 463. The positions of these three lines 461, 462, 463 are aligned with the four electrodes 401, 402, 403, 404 in such a way that the right control line 461 is matched with the right signal electrode 402 at one end, the left control line 463 is matched with the left signal electrode 401 at the other end. In addition, the ground line 462 is matched with the first and second ground electrodes 403, 404. The U-shaped conductive rubber pad 470 bridges between the left and right crystal shutters 410, 420. Using the above connection, the right and left control lines 461, 463 can conduct through the right signal electrode 402 and the left signal electrode 401 respectively. Besides, the ground line 462 also conducts through the first and second ground electrode 403, 404.

Referring to FIG. 5, there is the solid diagram of the nose-rack according to the present invention. The nose-rack 50 is shown as a front view in FIG. 5A, and a rear view in FIG. 5B. There are two nose-frames 51 on the nose-rack 50 which extends up with a straight plate 52 to form one upside-down Y-shaped structure. A half round convexity 53 and a stopper 54 are furnished on the front of the straight plate 52. By the mean of the installment, the nose-rack 50 can connect tightly with the shelf through the connecting hole. The end users can also adjust the altitude of the nose-rack 50 in the shelf to obtain the most comfortable wearing condition.

By the above description, the present invention provides comfortable, light-weighted, adjustable and low-cost 3D LCS glasses design for viewing many different types of 3D applications. While this invention has been described in what is presently considered to be the most practical and preferred embodiment, it is to be understood that the invention is not limited to the disclosed embodiments, but on the contrary, it is intended to cover various modifications and equivalent arrangements included within the spirit and scope of the appended claims.

What is claimed is:

1. Three dimensional liquid crystal shutter (LCS) glasses comprising:

a shelf having a joint to connect a frame and a nose-rack;

a frame having a connector that is connected to the joint of the shelf; and a Y-shaped nose-rack having a straight plate that is connected to the joint of the shelf, wherein the frame includes:

a left liquid crystal shutter having glasses and liquid crystal, the glasses further containing a left signal electrode and a first ground electrode thereon;

a right liquid crystal shutter having glasses and liquid crystal, the glasses further containing a right signal electrode and a second ground electrode thereon;

a printed circuit board between the left and right liquid crystal shutters, and having one left control line, one right control line and one ground line, where a first end of each of the left control line, the right control line and the ground line is connected to one three-wire conductive cable and second ends of the left control line, the right control line and the ground line are connected to the left signal electrode, the right signal electrode, and the first and second ground electrodes respectively; a conductive rubber pad, used as a conductor between the printed circuit board and the left and right liquid crystal shutters, further conducting electricity between the left control line of the printed circuit board and the left signal electrode of the left liquid crystal shutter, further conducting electricity between the right control line of the printed circuit board and the right signal electrode of the right liquid crystal shutter, and further conducting electricity between the ground line of the printed circuit board, the first ground electrode of the left liquid crystal shutter and the second ground electrode of the right liquid crystal shutter;

a three-wire conductive cable, connected to the first ends of the left control line, the right control line and the ground line, and extending out of the frame;

an inner frame, containing two glass basins, one printed circuit board basin and one cable groove, wherein the two glass basins locate the left and right liquid crystal shutters, the printed circuit board basin locates the printed circuit board, and the cable groove locates the three-wire conductive cable; and, an outer frame, for housing the left and right liquid crystal shutters, the printed circuit board, the conductive rubber pad and the three-wire conductive cable by combining with the inner frame.

2. The three dimensional LCS glasses of claim 1, wherein each of said two glass basins have a plurality of positioning bricks on the inner frame for the alignment of said left and right liquid crystal shutters, each of said two glass basins further having two rubber pad breaches for locating said conductive rubber pad.

3. The three dimensional LCS glasses of claim 1, wherein the printed circuit board basin has a plurality of positioning planks for alignment of said printed circuit board.

4. The three dimensional LCS glasses of claim 1, wherein the cable groove comprises an elongated straight track extending across the inner frame adjacent to said two glass basins and said printed circuit board basin.

5. Three dimensional liquid crystal shutter (LCS) glasses comprising:

a shelf having a joint to connect a frame and a nose-rack;

an inner frame having a connector that is connected to the joint of the shelf; and a Y-shaped nose-rack having a straight plate that is connected to the joint of the shelf, wherein the connector includes a shaft and two convex plates located in a middle of the inner frame, the shaft being fixed and supported by the two convex plates and embedded into an hooked cylinder of the joint that is furnished on the shelf.

6. The three dimensional LCS glasses of claim 5, wherein the shelf comprises one connecting rack, two ear-racks and the joint, the connecting rack linking the two ear-racks and the joint, the joint located on a middle of the connecting rack and comprising one connecting plate and one hooked cylinder, the connecting plate connecting the connecting rack and the hooked cylinder, the hooked cylinder having a breach to firmly engage the shaft of the frame.

7. The three dimensional LCS glasses of claim 6, wherein the connecting plate has a connecting hole with a sliding ditch at one side to connect the nose-rack.

8. The three dimensional LCS glasses of claim 7, wherein the nose-rack comprises two connected nose-frames, and one straight plate protruding upwardly from the nose-frames, the straight plate having a sliding stopper furnished laterally at a middle of the straight plate and a sliding convexity extending longitudinally from a top to the sliding stopper, the nose-rack being connected with the joint of the shelf by inserting the straight plate into the connecting hole.

9. Three dimensional liquid crystal shutter (LCS) glasses comprising:

a shelf having a connector to connect a frame and a nose-rack;

a frame having a joint housing connected to the connector of the shelf; and a Y-shaped nose-rack having a straight plate that is connected to the connector of the shelf, wherein the joint housing is located on a middle of an inner frame and includes two side plates, one front plate and two back plates which form a cylindrical cavity, the joint housing further firmly buckling the shaft of the connector furnished on the shelf.

10. The three dimensional LCS glasses of claim 9, wherein the shelf comprises one connecting rack, two ear-racks and one connector, the connecting rack linking the two ear-racks and the connector, the connector located on a middle of the connecting rack and including one connecting plate and one shaft, the connecting plate linking the connecting rack and the shaft, whereby the shaft is firmly inserted into the cylindrical cavity of the joint housing of the frame.

* * * * *